United States Patent Office 2,773,582
Patented Dec. 11, 1956

2,773,582
ARTICLE EXTRACTING DEVICE

Ivanhoe P. Denyssen, Merion Station, and Frank Rudbarg, Philadelphia, Pa., assignors to American Viscose Corporation, Philadelphia, Pa., a corporation of Delaware Application December 24, 1954, Serial No. 477,548

12 Claims. (Cl. 198—20)

This invention relates to apparatus for removing articles from, or loading them onto, a continuously moving support, and particularly to apparatus in which articles having a central opening must be moved directly away from or toward the supporting surfaces of a conveyor, such as the bottoms of individual containers for the articles, before they may be delivered to a receiver.

The invention is readily adaptable to any manufacturing process wherein it is desired to transfer articles one by one from a continuously moving conveyor system to a stationary or movable receiver, packaging machine, or the like. However, since a principal advantage of the present invention is the capacity of the apparatus thereof to remove an annular article, or other article having a central opening from a bucket-like container which fits closely to the lateral exterior sides of the article, the invention is hereinafter described in connection with a machine for centrifuging liquid from wet cakes of rayon yarn with which the apparatus of the invention is synchronized for centrifuging liquid from wet cakes of rayon yarn. It is contemplated also that the apparatus of the present invention may be operated to load as well as unload the bucket-like containers of such a centrifuging machine.

The centrifuging machine used in expressing liquid from rayon cakes comprises a number of rotary buckets spaced uniformly and carried about a common center. Each bucket contains a single cake which is rotated about its own axis at high speed by its individual driving motor during a substantial part of the circuit of the bucket about the center of the machine. At other portions of the circuit, the buckets, after being decelerated with respect to their rotational inertia, are loaded at one position and loaded at a position slightly advanced along the circuit from the unloading portion. When the processing rate for the machine is 2 to 3 seconds per cake, two workers are normally required to load and unload the machine. On account of the limited working space and the fixed speed of the machine, the manual labor of loading and unloading the machine is characterized by considerable tedium and discomfort. It is found that in carrying out labor of this character, the workers tend to become inattentive and that the full capacity of the machine is not always realized, as some of the buckets are normally allowed to traverse the circuit while empty. Furthermore, the use of two workers, or even one worker, for an article-handling operation that seems adapted for performance by automatic machinery, appears to be uneconomical.

It is an object of the present invention to construct apparatus for automatically removing recessed or centrally apertured articles from a conveyor, the apparatus having a minimum of working parts and mechanical motions in order to obtain increased smoothness of operation, greater safety, and lower maintenance than other known article-transfer machines. It is also an object to construct such apparatus with capacity to handle a plurality of packages or articles during a single cycle so as to reduce the overall movement of the apparatus per unit of the articles removed from or loaded onto, the conveyor by the apparatus in order that a conveyor of the type hereinafter described, may be automatically loaded, as well as unloaded automatically, by a single machine or by separate machines of the invention. It is a further object to construct apparatus of which the control system thereof may be readily changed to reverse the operation of the apparatus. That is, by changing the sequence of the operation of the control system, the apparatus may be caused to operate as a machine for loading the articles on a conveyor rather than as a machine for removing the articles therefrom.

In this manner, a single basic design of the apparatus may be utilized to obtain construction of separate machines mounted in cooperative relation with a conveyor for performing the loading as well as the unloading thereof. Other objects, features, and advantages will be apparent from the following description of the invention and the drawing relating thereto in which.

In brief, the invention consists of apparatus comprising a conveyor and a machine which are interrelated in construction and have cooperative parts whereby articles having central openings are supported in spaced positions on the conveyor with their axes parallel, and must be necessarily moved in an axial direction before they may be moved in a direction extending laterally with respect to the conveyor, and/or reoriented during transferal to a receiver. In this invention, the machine preferably comprises a unit capable of simultaneously handling a plurality of articles, and in the specific embodiments herein described, two article-grippers are reciprocally supported on a frame that is swingably supported on a movable boom, the frame being swingable with respect to an axis in fixed relation to the boom and generally parallel to the path of the conveyor movement or a tangent thereof.

The boom is supported for movement along an ambit parallel to a path of the conveyor and is propelled through successive advance movements in which the boom is held in a fixed position over the conveyor. During such movements, successively spaced portions of the conveyor engage a member of the machine that is repetitively retracted to disengage the machine from the conveyor. The machine comprises a jack which returns the boom to the initial position to start another cycle.

An essential part of the machine is a jack which is mechanically connected with, and interposed between, the swingable frame and the retractable member so that it may operate to apply force urging the frame outwardly from the boom while simultaneously urging the member to a position of retraction. However, by use of appropriate leverage ratios in connecting the jack with the frame and the member, the member retracts more easily than the frame yields. Thus, the member retracts until it engages a stop and thereafter the frame is swung outwardly away from the boom to a position in which articles may be either released from, or seized by reciprocable grippers supported by the frame. The motions by which the machine operates are preferably executed by pneumatic jacks.

Figure 1:
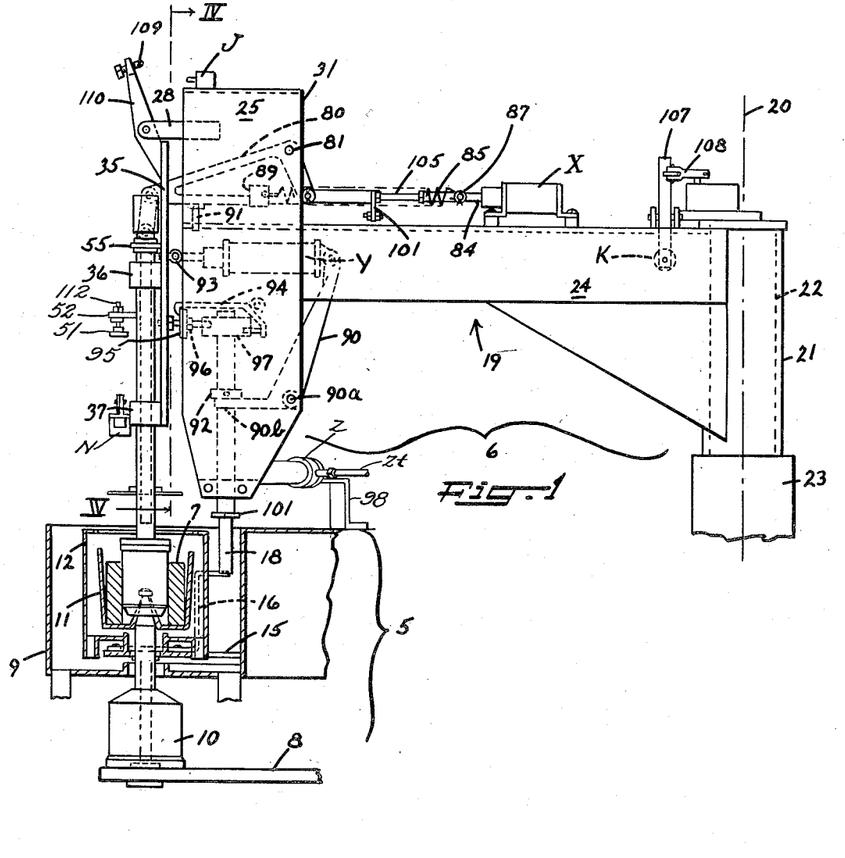
Fig. 1 is a fragmental side elevation of the apparatus of the invention with parts of a conveyor-type centrifuging machine shown in section.
Figure 2:
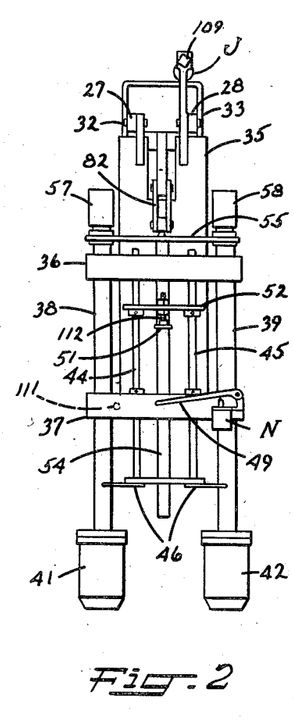
Fig. 2 is an end elevation of the article-extracting portion of the apparatus shown in Fig. 1.
Figure 3:
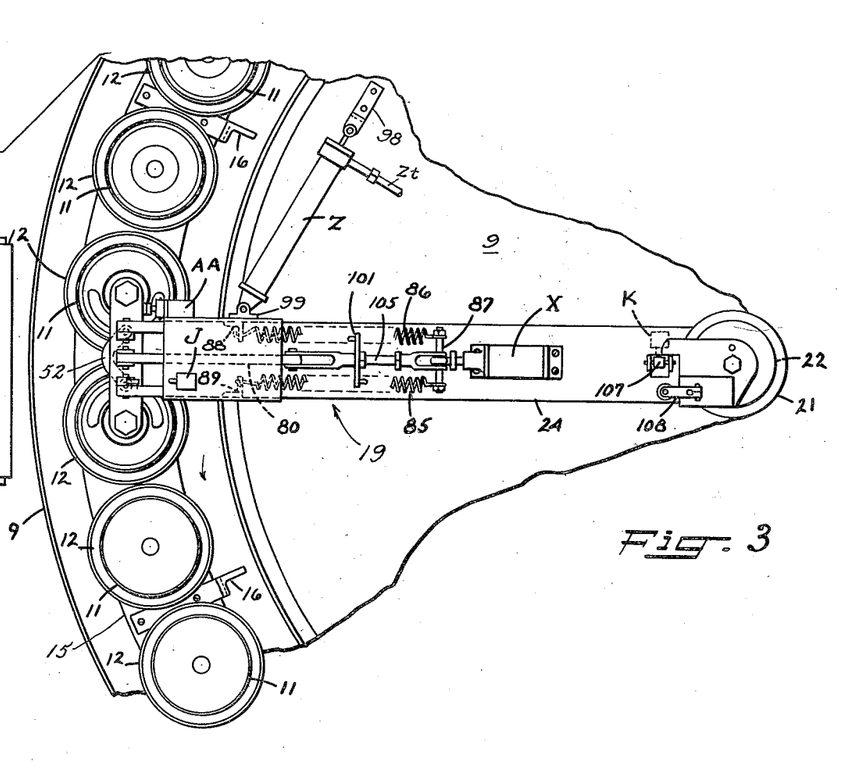
Fig. 3 is a fragmental top view of the apparatus shown in Fig. 1.

Figs. 1 and 3 are elevation and plan views, respectively, of apparatus constructed in accordance with the present invention comprising a centrifuging machine 5 for centrifugally removing liquid from annular yarn packages 7, and a machine 6 for extracting the packages 7 from the machine 5. The centrifuging machine 5, except as hereinafter described, has the general construction of the apparatus described in Patent No. 1,986,434. Briefly, it comprises a revolving circular frame 8, an annular canopy 9, a plurality of motors 10, supported along a circumference of the frame 8 at uniformly spaced positions with the axes of the motors parallel. Each motor 10 supports a bucket 11 in direct drive relationship within a non-rotatable, drum-like shield 12 which drains liquid toward the bottom of the canopy 9. The shields 12 are mounted on a ring-like frame 15 supported on the frame 8 extending horizontally around the axis 20 within the canopy 9. Also mounted on the frame 15 are a plurality of S-shaped brackets 16 of which the upper portions extend horizontally and radially to engage a pin 18 of the machine 6 when this pin is disposed in its lower position.

The package extractor 6 comprises a boom 19 supported pivotably for swinging about the axis 20 of the centrifuging machine. The boom has an upright rotatable portion 21 in bearing relation with a shaft 22 which makes a horizontal shoulder with a pedestal 23. The horizontal cantilever portion 24 of the boom supports the head portion 25 which houses a substantial portion of the mechanism of the extractor 6. Portions of a pair of supports 27 and 28 extend from side plates 29 and 31 of the head portion which have pivot pins 32 and 33 extending coaxially and horizontally therethrough for pivotably supporting a swingable frame 35. Extending horizontally across the face of the frame 35 and attached thereto are a pair of hollow slide blocks or tubes 36 and 37 which have apertures through which extend a pair of hollow guide rods 38 and 39; these guide rods are reciprocable with respect to the blocks 36 and 37 and support article grippers 41 and 42, respectively. Another pair of smaller parallel guide rods 44 and 45 support a package follower 46. The follower 46 bears in accordance with its weight on any article, such as a yarn cake, held by the grippers 41 and 42 and thus implements the removal of cakes of yarn from the grippers. A main function of the follower however, is to measure the extent of axial movement of the cakes relative to the grippers after the cakes are released and to actuate a valve N when the cakes are free of the grippers. A lever 49 of the valve N extends into the path of a tappet 51 supported by a U-shaped tie member 52 attached to, and extending between the guide rods 44 and 45.

For rigidity, the reciprocable assembly comprising the slide rods 38 and 39 includes also another slide rod 54 which extends centrally between the slide blocks 36 and 37. All three slide rods 38, 39 and 54 are tied together by a horizontal tie plate 55.

The slide rods 38 and 39 support at their upper ends, fluid cylinders 57 and 58, respectively, and at their lower ends, grippers 41 and 42, respectively. Each slide rod is hollow so that the piston of the fluid cylinder attached thereto may be connected to the gripper by a piston rod which operates the fingers of the gripper. For example, in Fig. 5, a piston 59 is fixed to one end of a piston rod 61 which extends coaxially through the slide rod or tube 38. A bearing 62 is provided in the lower end of the tube 38 to limit the piston rod 61 to a precise path of reciprocation. Fixed to the lower end of the piston rod is a disc 63 of which a circular peripheral section 64 is rounded on both sides to enable the disc to operate in toggle relation with a plurality of bell cranks 65, such as the crank which pivots at 66 to carry a pressure plate 67 toward and away from the longitudinal axis 68 of the assembly shown in Fig. 5. As shown in Figs. 6 and 7, each gripper comprises a plurality of bell cranks 65 and pressure plates 67 which work simultaneously as a result of reciprocal movements of the piston rod 61 to grip or release a cake of yarn brought into surrounding relation with the lateral periphery of the gripper.

Figure 5:
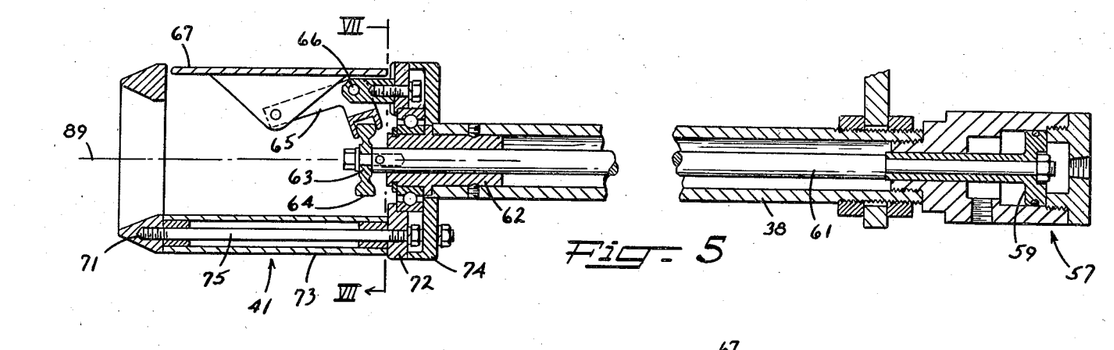
Fig. 5 is a shortened sectional view of one of the two reciprocating assemblies partly constituting the apparatus shown in Fig. 2.
Figures 6, 7:
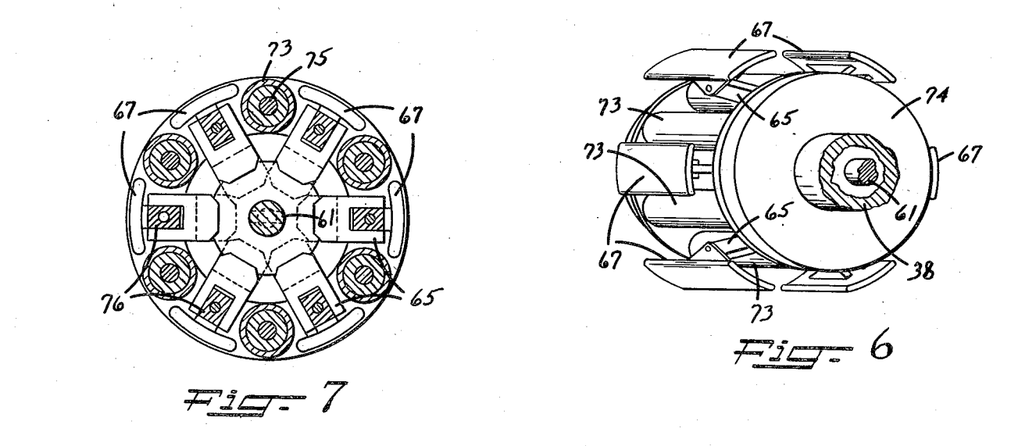
Fig. 6 is a perspective view of the article gripping device shown in the lower portion of Fig. 5.
Fig. 7 is a diametral sectional view of the device taken along line VII—VII of Fig. 5.

The rigid structure of the grippers consists of, as shown in Figs. 5, 6, and 7, a tapered annular ring member 71 and a flat sided annular ring member 72, a plurality of tubular spacers 73 for spacing the ring members 71 and 72, an annular cover or shield 74, bolts 75 extending through the ring members, the shield and the tubular spacers to hold the entire rigid or frame portion of the grippers together. Elements 76 are bolted to the underside of the ring member 72 to provide pivotal support to the bell cranks 65. Elements 76 have the further function in conjunction with the tubes 73 of limiting the inward travel of the pressure plates 67.

The cake pick-up assembly comprising the grippers, slide tubes 38 and 39, the fluid cylinders 56 and 58, the slide rod 54 is reciprocated as a unit by a bell crank 80 which pivots about a pin 81 extending horizontally between the head plates 29 and 31. The bell crank 80 is connected at one end to the assembly by a pair of links 82; at its other end the bell crank is connected to the piston rod of a fluid cylinder X. Movement of its piston rod 84 toward the left as shown in Fig. 1 results in clockwise movement of the bell crank and lifting of the cake pick-up assembly. The arrangement shown permits the assembly to be reciprocated relative to the frame 35 regardless of its angle of tilt relative to the boom. Cylinder X is aided in lifting the assembly by a pair of compression springs 85 and 86 which are attached at their right ends (see Fig. 1) to an anchor pin 87 and at their left ends to cleats 88 and 89 attached to the head plates 29 and 31. The downward motion of the cake pick-up assembly is arrested by a set screw 91 extending vertically in threaded relation with top plate of the cantilever portion of the boom inside the head portion 25. The set screw engages the undersurface of the bell crank 80.

Two other motions of the extractor 6, are namely, swinging the frame 35 and the reciprocal cake pick-up assembly carried thereby outwardly on the pivotal axis thereof extending through pins 32 and 33, and retraction of the vertically reciprocal pin 18. These motions are accomplished by the fluid cylinder Y which is mounted internally of the boom 19 and primarily within the head portion thereof. The cylinder Y is connected by one end to a bell crank 90 which pivots relative to the side walls 29 and 31 on a pin 90a anchored in the walls. The end portion 90b of the bell crank 90 remote from that portion attached to the cylinder Y is bifurcated and straddles the rod 18 to engage a collar 92 secured at a desired point along the rod. Movement of the bell crank 90 in a clockwise direction thus raises the rod 18.

The piston rod of the cyinder Y is pivotably connected with the frame 35 at 93. Operation of the cylinder Y to force the piston rod outwardly of the cylinder produces forces in opposite directions simultaneously to raise the rod 18 and to swing the frame 35 and the article-gripping assembly outwardly away from the head portion of the boom. However, as the apparatus is illustrated in Fig. 1, swinging of the frame 35 cannot occur until the rod 18 has retracted out of engagement with the bracket 16 of the centrifuging machine 5 and the catch or latch 94 has been swung out of engagement with a cleat 95 bolted to the back side of the frame 35. The cleat 95 engages a set screw 96 screwed into a slide block or guide 97 fixed within the head portion of the boom. The set screw limits the swinging of the frame 35 and the article-gripping assembly carried thereon inwardly toward the lower portion of the boom. When the latch 94 has released the frame 35 by disengagement from the cleat 95, the article-grippers 41 and 42 swing in a clockwise direction away from the boom whereupon the grippers may be operated in accordance with the control system of Fig. 8 to release articles held thereby. Obviously the grippers, before they may be swung outwardly, must be fully elevated by operation of the cylinder X and the resulting clockwise movement of the bell crank 80 in order to clear all portions of the centrifuging machine 5. At this particular instant, the pressure plates of each gripper are urged outwardly to firmly engage the inner periphery of a yarn cake. The swinging of the frame and the grippers outwardly away from the boom may be accomplished during the clockwise return stroke of the boom and all of the apparatus supported thereby resulting from operation of cylinder Z. One end of this cylinder is shown pivotally attached, as shown in Figs. 1 and 3, to the stationary canopy 9 by a bracket 98. The other end of the cylinder is pivotally attached to side plate 29 of the boom by a bearing 99. As shown, the piston rod end of the cylinder Z is secured to the bracket 98 so that air, admitted to the end of the cylinder through the tube Zt, returns the boom to starting position from which it is carried by one of the brackets 16 secured to the rotatable frame 15.

In the practice of the invention, it has been found that apparatus arranged as shown in Fig. 1, the fluid cylinder Y will first retract the rod 18 from engagement with a bracket 16 before swinging the frame 35 outwardly without the need of a catch mechanism, such as that comprising the catch 94 and the cleat 95.

Figure 8:
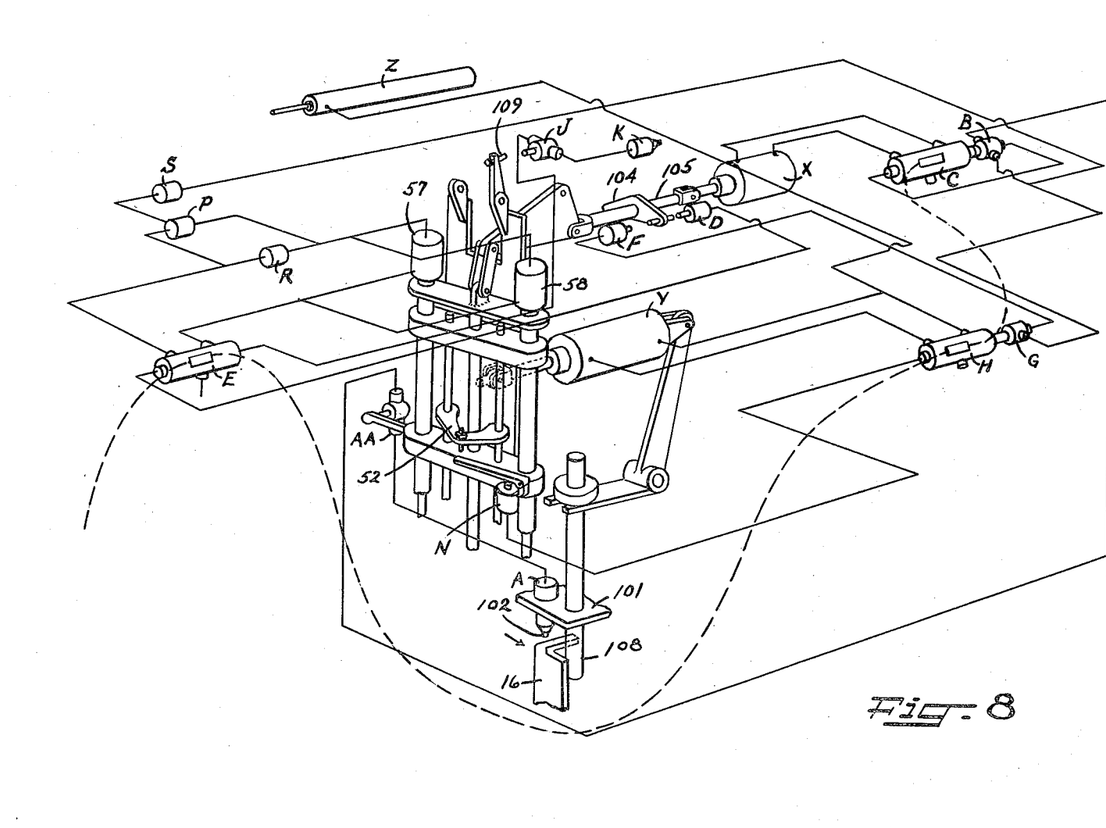
Fig. 8 is a diagram of a pneumatic system for operating the apparatus of Figs. 1 and 3 as a machine for unloading the centrifuging machine of Fig. 1.

When the apparatus of the invention is interrelated by a control system, such as illustrated in Fig. 8, adapting it for removing cakes from a centrifuging machine such as that designated by numeral 5 of Fig. 1, the cake remover 6 may be controlled in the manner to be described immediately below. A bleeder valve A is supported by a guide plate 101 near the lower end of the retractable rod 18. The rounded button 102 protruding from the lower end of the valve A is momentarily engaged by the upper surface of a bracket 16 as the centrifuging machine revolves into engagement with the pin 18. Valve A, while depressed, bleeds a control valve C through a dual control pilot valve B. Valve C then admits air to the rod end (left end as viewed in Fig. 8) of the cylinder X. This movement of the cylinder causes lowering of the reciprocal cake pick-up assembly. Because one of the brackets 16 mounted on the rotary frame 15 is engaged with the pin 18, the boom is, during the descent of the cake pick-up (also during the ascent thereof), being rotated with the centrifuging machine and maintained at a fixed location over two rotary buckets which are perfectly aligned with the paths followed by each of the cake grippers with the frame 35 positioned as shown in Fig. 1.

As the piston rod of cylinder X reaches the end of its stroke to the right, the grippers 41 and 42 are placed in their extreme downward position. A valve actuator 104 mounted on the push rod 105 of cylinder X engages the button head of a bleeder valve D which bleeds a control valve E. The bleeding of the control valve E causes air to be admitted to a regulator valve R from which it goes to operate the pick-up cylinders 57 and 58. Air at this juncture goes to the upper end of the pick-up cylinders; the piston rods thereof extending through the slide tubes 38 and 39 move downwardly to move the gripper pressure plates outwardly with respect to the supporting cage therefor to grip the inside surfaces of the cakes. When the grippers are fully expanded, air pressure is built up in the line from the pick-up cylinder which is relieved through a check valve P to a sequence valve S. Air then passes through the sequence valve and actuates the dual control pilot valve B to bleed the control valve C. In addition, a pilot valve G is operated through a common line to open the line from the valve H to the bleeder valve F. As a result, valve C admits air to the piston end of the cylinder X thereby raising the cake pick-up assembly.

As the cake pick-up assembly reaches its extreme upper position relative to the frame 35, the valve actuator 104 mounted on the push rod of the cylinder X engages in the button head of the bleeder valve F which bleeds the control valve H through the pilot valve G. Thereupon, the control valve H admits air to the piston end of cylinder Y and the rod end of cylinder Z simultaneously. The cylinder Y retracts the pin 18, thus disengaging it from the bracket 16, and the cylinder Z swings the entire machine 6 to an initial position wherein it may be again engaged by a bracket of the centrifuging machine 5. In a manner hereinbefore described, the cylinder Y continues operation after the pin 18 is raised to relieve the catch 94 and allow the cake pick-up assembly as propelled by the cylinder Y to swing in a counter-clockwise direction outwardly away from the boom. Meanwhile, the cylinder Z has returned the boom to a rest position.

Figure 4:
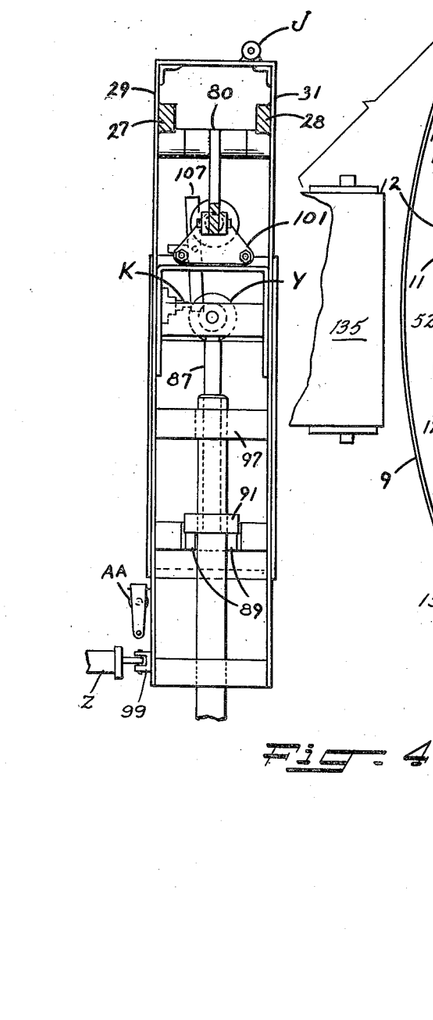
Fig. 4 is an elevation in section taken along line IV-IV of Fig. 1.

A valve K, positioned along the inner surface of the left wall (as viewed in Fig. 4) of the cantilever portion 24 of the boom, extends toward the opposite inner wall surface of the cantilever portion with the button facing toward the latter wall. The button of the valve K is engaged by a lever 107 which is pivotally supported along the upper surface of the cantilever section of the boom with respect to an axis extending horizontally and radially of the two machines. The lever, during the return stroke of the boom, is engaged by a spring loaded toggle 108 which holds the lever in engagement with the button of the valve K even though the lever is carried to a position free of the toggle 108 as the boom reaches a position of rest. However, the valve K cannot bleed the valve E until the pilot valve J is open.

As the frame 35 and the cake pick-up assembly reaches its unloading position at the end of its stroke in swinging away from the head portion of the boom, a screw 109 supported on a projection 110 of the frame contacts the button head of the pilot valve J mounted atop the head portion 25 whereupon control valve E is bled through the bleeder valve K. Valve E is thereby caused to admit air to the rod ends of the cylinders 57 and 58 which operate the grippers 41 and 42 to withdraw the pressure plates of the grippers from the inner periphery of the cake held by the grippers. The cake push-off member 46, which in the meantime is resting on the top surfaces of the cakes, follows the cakes as they slide off the grippers. A contact screw 112, fixed on the tie plate 52 of the slide rods 44 and 45 which support the cake push-off, engages the elever 49 of the bleeder valve N. Opening the valve M bleeds the control valve H which is actuated thereby to admit air to the rod end of the cylinder Y. The piston rod of cylinder Y is pulled inwardly of the cylinder to pull the frame and cake pick-up assembly back into position against the set screw 96 and to allow the pin 18 to drop to its lower position.

The frame 35 returns to its original position and is latched by the catch 94. A valve AA mounted on the side wall 29 is engaged by a set screw 111 supported on an end portion of the slide block 37. A valve AA is incorporated in the control system as a safety feature assuring that the cylinder X will not be accidentally caused to operate before engagement of the bleeder valve A with a bracket 16 of the centrifuging machine.

To initiate the cycle such as described, the centrifuging machine rotates a bracket 16 into a position against a retractable pin 18. When moving into this position the upper surface of the bracket momentarily presses the button of the valve A, thus bleeding the line to the pilot valve B.

Figure 9:
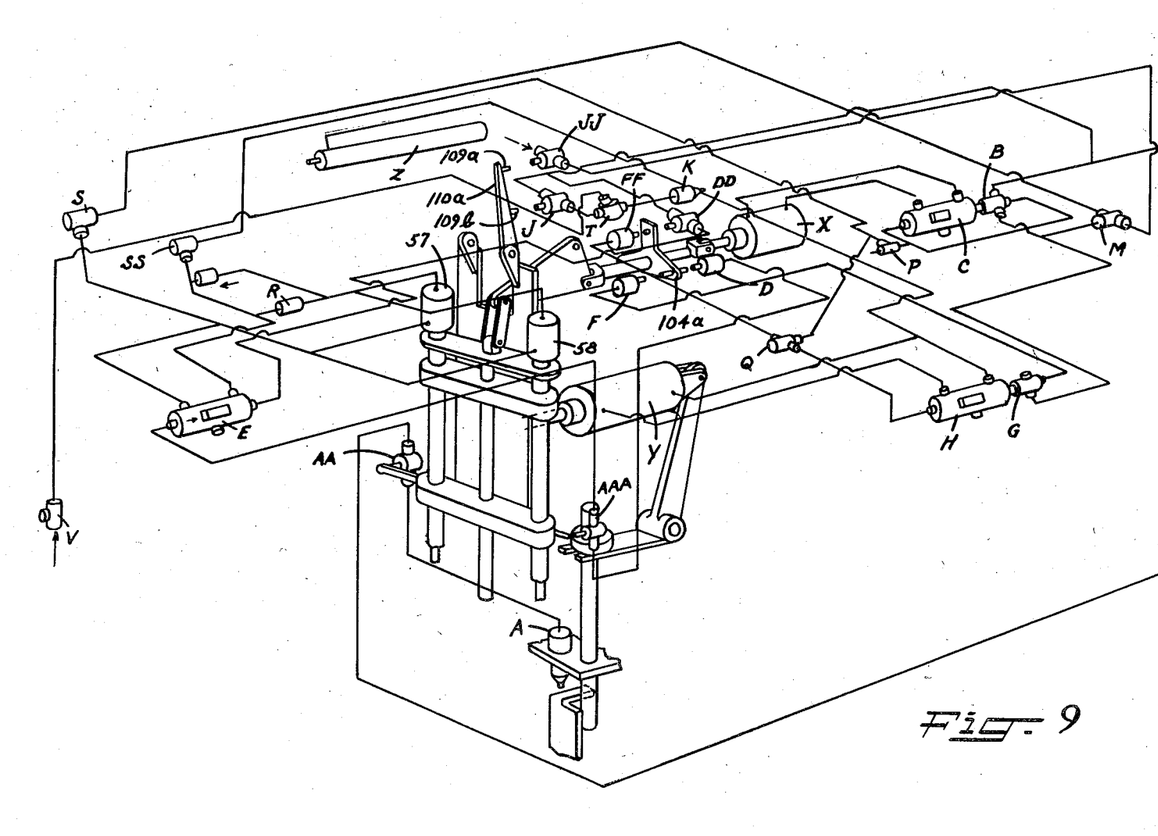
Fig. 9 is a diagram of a pneumatic system for operating the apparatus of Figs. 1 and 3 as a machine for loading the centrifuging machine of Fig. 1.
Figure 10:
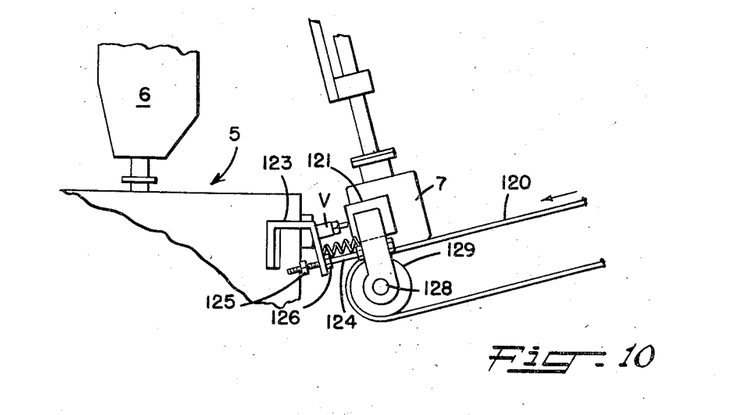
Fig. 10 is a diagrammatic fragmentary elevation of apparatus adapted for delivering packages to the apparatus of the invention and functioning in accordance with the control system illustrated in Fig. 9.
Figure 11:
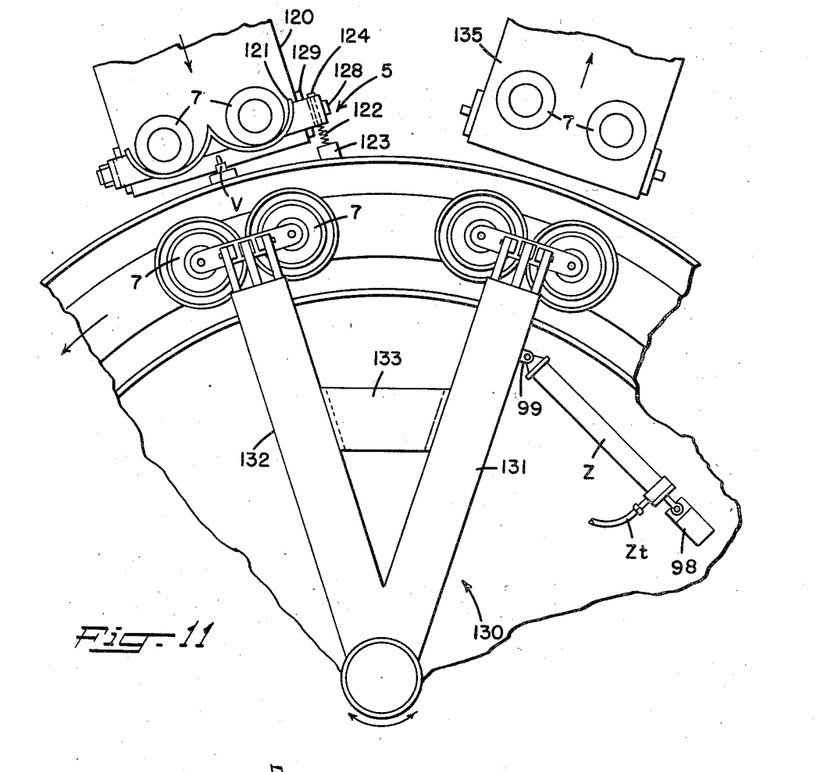
Fig. 11 is a diagrammatic plan view of modified apparatus comprising two units such as illustrated in Figs. 1 and 3, and, in addition to the centrifugal machine portions shown, illustrating a package-feeding conveyor and a package-receiving conveyor.

When the apparatus of the invention is to be used for loading other apparatus, such as the centrifuging machine 5 shown in Fig. 1, the same basic apparatus may be used with its mode of operation modified by rearrangement of the control system as shown diagrammatically in Fig. 9. With reference to Fig. 10, the apparatus typified by the machine 6 of Fig. 1 may be employed to seize or grip annular articles such as yarn packages 7 supported on a conveyor 120 after reaching a position thereon in which they are restrained from further movement by a holder 121. The holder (illustrated also in Fig. 11) is provided for properly positioning packages 7 so that the inner surface thereof is aligned to receive the grippers 41 and 42. The holder has another important function in operating the button operated valve V shown in the diagram of Fig. 9. In the absence of packages on the conveyor, the holder is held away from the valve by a compression spring 122, supported against a bracket 123 on which the valve V is mounted. A slight range of movement of the holder into and out of engagement with the valve is provided by a rod 124 and nuts 125 and 126 spaced thereon at each side of the bracket 123 through which the rod extends. The holder 121 may be mounted swingably as shown on the shaft 128 of the conveyor roll 129. The holder 121 may be used in a similar manner to operate a switch 140 for controlling a motor (not shown) for driving the conveyor 120. A pin 141 on the hub of the holder actuates the switch. Consequently, when yarn cakes are removed from the conveyor 120, the switch 140 is closed. The conveyor thus operates to place more cakes against the holder.

In using the machine 6 for loading the centrifuging machine 5, a somewhat more complicated control system is required which arises from the necessity of the grippers 41 and 42 having to traverse two complete reciprocating cycles during the cycle of the machine 6 as a whole. For purposes of description, the cycle of the machine operating as loading apparatus is arbitrarily commenced with the grippers poised over the circular path traversed by the turntable and buckets 11 of the centrifuging machine. The frame 35 is retracted to a vertical position relative to the head portion of the boom with the cleat 95 held against the set screw 96 by the latch 94. The grippers 41 and 42 have their fingers or pressure plates 67 extended for supporting packages thereon. Assuming the centrifuging buckets 11 to be moving uniformly along a circular path, a bracket 16 revolves over and past the bleeder valve D and depresses the button thereof. As the bracket clears the valve button, it engages the actuating pin 18. Thereupon the boom is moved counterclockwise at the same angular rate as the turntable of the centrifuging machine. As described previously with respect to the machine 6 operating as a cake unloader, actuation of the valve A and the two-way valve AA bleeds the control valve C through the dual control pilot valve B. The valve C thereupon admits air to the rod end of the cylinder X. As the piston thereof is moved, the cake pick-up assembly moves downwardly to position the grippers with cakes supported thereon within a pair of buckets 11 of the centrifuging machine.

When the cake pick-up assembly reaches its lowest position the valve actuator 104a contacts the button head of the bleeder valve D which bleeds the control valve E through the valve AAA in the line from the valve D to the valve E. The valve E admits air to the rod end of the gripper-actuating cylinders 57 and 58 to withdraw the pressure plates 67 from engagement with the inner surfaces of the cakes. The cakes are thus released and positioned within the rotatable buckets 11 of the centrifuging machine. When the pressure plates of the grippers are released, pressure is built up in a common line to the cylinders 57 and 58 and the sequence valve S. Air then passes through the sequence valve S and actuates the dual pilot valve B which bleeds the control valve C. Thereupon, the valve C admits air to the piston end of the cylinder X to raise the cake pick-up assembly relative to the frame 35. In addition, the pilot valve G is operated through a common line which causes the valve G to open the line from the valve H to the valve F.

When the cake pick-up assembly reaches its highest position, the valve actuator 104 contacts the button head of the bleeder valve F to bleed the control valve H through the pilot valve G. Thereupon, the control valve H admits air to the piston end of the cylinder X and the rod end of the cylinder Z. The cylinder X pushes the lever 87, thus raising the actuating pin 18 and disengaging it from contact with a bracket 16. As the actuating pin passes out of contact with the bracket, the cylinder Z returns the machine 6 to a rest position.

The next operation to be accomplished is to swing the cake pick-up assembly into position to seize cakes supported on the conveyor 120 against the holder 121. As the boom is returned to its rest position, a set screw carried by the lever 107 engages the button of the bleeder valve K mounted along the inner surface of the left wall of the cantilever portion of the boom as hereinbefore described. In the meantime, the cylinder Y continues to raise the actuating pin 18 which raises the latch 94 and unlatches the frame 35. Whereupon the cylinder Y pushes the frame and the cake pickup assembly to its furthest outward position with respect to the boom.

It is now necessary for the cake pick-up assembly to descend toward the cakes supported on a conveyor 120. When the frame 35 reaches its inclined loading position, screws 109a and 109b carried between the extension 110a of the frame 35 engage pilot valves JJ and J, respectively, whereupon the control valve C is bled through the bleeder valve K (operated as described in the preceding paragraph), the pilot valve T, and a dual control pilot valve B. The valve is thus caused to admit air to the rod end of the cylinder X to lower the cake pick-up assembly relative to the frame 35. The valve T is a safety valve actuated to the open position by air from the valve V (shown in Fig. 10) which is actuated when the yarn cakes are properly positioned on the cake-supply conveyor 120 with respect to the path of the grippers at the inclined position of the frame 35. Actuation of the valve JJ bleeds the line extending between the valves B and G through the valve M so that the valves B and G are not actuated at this time.

At this stage, the grippers have reached their lowest position inside the cakes 7 supported against the holder 121 on the conveyor 120. As this happens, the valve actuator 104a engages the button head of a two-way valve DD allowing the valve E to bleed therethrough and also through valves J and K. The valve E, at this point, admits air to the regulator valve R. From there, the air goes to the piston ends of the gripper-actuating cylinders 57 and 58. The pressure plates thereof are then extended to grip the cakes. When the grippers are fully expanded, pressure is built up in the line to the piston ends of the cylinders 57 and 58 which causes air to pass through the sequence valve SS to actuate the valve P which, when actuated, bleeds the valve C therethrough. Simultaneously, the valve Q is actuated by air from the sequence valve SS to open the line from the valve H to the valve FF. Air is thereupon admitted to the piston end of the cylinder X to effect raising of the cake pick-up assembly.

As the cake pick-up assembly reaches its uppermost position it must swing inwardly to a position over the centrifuging machine preparatory to placing the cakes therein. Thus, the valve actuator 104a engages the button head of the bleeder valve FF which bleeds the valve H through the valve Q. The valve H admits air to the rod end of the cylinder Y which thereupon rotates the bell crank 87 in a counterclockwise direction and pulls the frame 35 and the cake pick-up assembly inwardly toward the boom. The actuating pin 18 drops to its lowest position and the frame 35 is latched in its vertical position. Thus, a complete cycle of the cake loading machine is completed and the valve A awaits contact with a bracket 16 for initiating another cycle.

The apparatus of the invention has been described with respect to two embodiments which illustrate the use of the apparatus as an unloader as well as a loader for a machine which is typified by the centrifuging machine 5. It is also practical to combine these two different embodiments into a single machine which is illustrated schematically in Fig. 11 wherein the machine 130 comprises an unloading boom 131 and a loading boom 132 rigidly connected by a beam 133. The unloading section of the machine 130 operates in accordance to the description of the embodiment of the invention illustrated by Figs. 1 and 8 while the loading section operates in accordance with the description of an embodiment illustrated by Figs. 1 and 9. The unloading and loading sections of the machine are basically alike except for their control systems. The grippers of the unloading section perform the function of positioning cakes on a take-away conveyor 135 whereas the loading section is supplied cakes by the conveyor 120.

It is necessary, of course, to interrelate the control systems for the different sections of units by a common bleeder valve A and a common boom-return cylinder Z. It will be noted in each control diagram that the piston ends of cylinders Z and Y receive air from a common supply line. To assure the withdrawal of cake grippers of both sections from buckets of the centrifuging machine before movement of cake pick-up frame of either section, or before operation of boom-return cylinder Z, the present line of one section extending to the cylinder Z and the cylinder Y of that section, in accordance with one of the diagrams of Figs. 8 and 9, may be terminated as a pressure-operated valve in the line of the other section extending to the cylinder Z. The line of the latter section will also extend to the piston ends of the Y cylinders of both units of the duplex machine. Such a machine, obviously, completely eliminates manual labor in loading and unloading a machine which is a centrifugal liquid extractor for yarn cakes.

While preferred embodiments of the invention have been shown and described, it is to be understood that changes and variations may be made without departing from the spirit and scope of the invention as defined in the appended claims.

We claim:

1. In a system for handling articles comprising a conveyor member which continuously traverses a fixed path and has means uniformly spaced along the member for supporting separate articles; the conveyor member having a plurality of detents, each detent having fixed identical relation to one of said means and the path; an article-supporting member in spaced later relation with the conveyor; an apparatus operating in successive cycles to transfer articles from one member to the other, comprising means for gripping one of said articles, a primary supporting means, reciprocable means carried by the primary supporting means having an ambit of reciprocation relative to the primary means extending in a direction toward and away from the members, a movable secondary supporting means for said primary means, stationary means for supporting said secondary means and limiting the movement of the secondary means to ambit parallel to said path, means for pivotably connecting portions of the primary means remote from the path of the secondary means along an axis substantially parallel to the path, an element supported by the secondary means for movement relative thereto into and out of a position for engagement with successive detents, and a jack having one end connected with said primary means and its other end connected with said element for the simultaneous application of force in opposing directions for swinging the free end of the primary means away from the secondary means and moving the element out of said position for engagement with a detent.

2. In a system for handling articles comprising a conveyor member which continuously traverses a fixed path and has means uniformly spaced along the member for supporting separate articles; the conveyor member having a plurality of detents, each detent having fixed identical relation to one of said positions and the path; an article-supporting member in spaced lateral relation with the conveyor; and apparatus operating in successive cycles to transfer articles from one member to the other comprising means for gripping one of said articles, power-operated means for actuating the gripping means, a primary supporting means, reciprocable means carried by the primary supporting means having an ambit of reciprocation relative to the primary means extending in a direction toward and away from the members, a movable secondary supporting means for said primary means, stationary means for supporting said secondary means and limiting the movement of the secondary means to an ambit parallel to said path, means for pivotably connecting a portion of the primary means remote from the path to the secondary means along an axis substantially parallel to the path, an element supported by the secondary means for movement relative thereto into and out of a position for engagement with successive detents, a jack and means associated therewith for connecting one end of the jack with said primary means and its other end with said element to simultaneously apply force in opposing directions for swinging the free end of the primary means away from the secondary means and moving the element out of said position for engagement with a detent, power-operated means for reciprocating the reciprocable means, power-operated means for moving the secondary means relative to the stationary means through return strokes opposite in direction to the direction of movement of the conveyor to a rest position, and control means for actuating the jack and all of said power-operated means in cyclical relationship.

3. In a system as defined in claim 2 wherein the apparatus comprises a stop for said element and the jack is related to the primary supporting means and the element through leverage ratios embodied in the connecting means providing a greater application of force to the element than the primary means whereby the element is first moved out of engagement with the conveyor, then as the element engages the stop, the primary means is swung away from the secondary means.

4. In a system as defined in claim 2 wherein all of said power-operated means are jacks.

5. In a system as defined in claim 2 wherein said jack and said power-operated means, except the means for returning secondary means to a rest position, are double-acting pneumatic jacks, said excepted power-operated means comprising a single-acting pneumatic jack.

6. In a system as defined in claim 2 wherein said apparatus is operable to transfer articles from the conveyor member to the article-supporting member, the control means comprising means for actuating the power-operated reciprocating means through a cycle of movement concurring with an alignment of the ambit of the reciprocable means with the path, and means for actuating the gripping means to grip an article between the advance and return strokes of the reciprocable means, and means for actuating the gripping means to release the articles in concurrence with an alignment of said ambit with a fixed point immediately above the article supporting member.

7. In a system as defined in claim 2 wherein said apparatus is operable to transfer articles from the conveyor member to the article-supporting member, the control means comprising means for actuating the power-operated reciprocating means through two cycles of movement within a single cycle of the apparatus as a whole, each of said two cycles consisting of an advance and return movement relative to the primary means, one of said two cycles concurring with the alignment of the ambit of reciprocable means above the article supporting member point at the end of a return stroke of the secondary means, and the other cycle concurring with the alignment of such ambit with said path during an advance stroke of the secondary means, means for actuating the gripping means to grip an article between the advance and return strokes of the first of said two cycles of the reciprocable means, and means for actuating the gripping means to release the article between the advance and return strokes of the latter of said cycles.

8. In a system for handling articles comprising a conveyor member which continuously traverses a fixed path and has means uniformly spaced along the member for supporting said articles, the conveyor having a plurality of detents, each detent having fixed identical relation to one of said positions and the path; an article-supporting member in spaced lateral relation with the conveyor; and apparatus operating in successive cycles to transfer articles from one member to the other comprising means for gripping one of said articles, a primary supporting means, a reciprocable means carried by the primary supporting means having an ambit of reciprocation relative to the primary means extending in a direction toward and away from the members, a movable secondary supporting means for said primary means, stationary means for supporting the secondary means and limiting the movement of the secondary means to an ambit parallel to said path, means for pivotably connecting a portion of the primary means that is more remote than substantially the rest of the primary means from the path to the secondary means along an axis substantially parallel to the path, an element supported by the secondary means for movement relative thereto into and out of a position for engagement with successive detents, a latch, latch-engaging means associated with said primary means normally adapted for interlocking relation with the latch in the position of the primary means for aligning said ambit with the path, said latch being disposed relative to the element to be carried thereby out of engagement with a detent, a jack and means associated therewith for connecting one end of the jack with the primary means and its other end with said element whereby force is simultaneously applied in opposite directions, said connecting means being related to the element and the primary means to first move the element out of said position for engagement with a detent, then release the latch and swing the end of the primary means nearer the path away from the secondary means.

9. In a system for handling articles comprising a conveyor member which continuously traverses a fixed path and has means uniformly spaced along the member for supporting separate articles; a conveyor member having a plurality of detents, each detent having fixed identical relation to one of said positions and the path; an article-supplying member in spaced lateral relation with the conveyor; an article-receiving member spaced upstream of the direction of movement of the conveyor and in spaced lateral relation therewith; and apparatus comprising a loading unit and an unloading unit in rigid connection therewith; the units being of similar construction and each unit comprising means for gripping one of said articles, a primary supporting means, reciprocable means carried by the primary supporting means having an ambit of reciprocation relative to the primary means extending in a direction toward and away from the members, a movable secondary supporting member for said primary means, stationary means for supporting said secondary means and limiting the movement of the secondary means to an ambit parallel to the path, means for pivotably connecting a portion of the primary means that is more remote than substantially the rest of the primary means from the path to the secondary means along an axis substantially parallel to the path, an element supported by the secondary means for movement relative thereto into and out of a position for engagement with successive detents, a jack and means associated therewith for connecting one end of the jack to said primary means and its other end with said element to simultaneously apply force in opposing directions for swinging the free end of the primary means away from the secondary means and moving the element out of said position for engagement with a detent, power-operated means for reciprocating the reciprocable means, power-operated means for actuating the gripping means; power-operated means for moving the assembly comprising both units relative to the stationary means to a position of rest through return strokes opposite to the direction of movement of the conveyor and control means for each of the units for actuating the power-operated means thereof and said power-operated means for moving said assembly of units in cyclic relationship.

10. In a system for handling articles comprising a conveyor which continuously traverses a fixed path, and apparatus for removing successive articles from the conveyor along a fixed portion of a path, said apparatus having a movable element, said conveyor having means spaced lengthwise thereof for supporting said articles and having like detent means for engaging the element adjacent each of said supporting means in identical orientation and relative location widthwise and lengthwise of the conveyor with respect to each of such supporting means; the apparatus comprising means for lifting the articles from the conveyor, movable primary means for supporting the lifting means over the conveyor, secondary means for swingably supporting the primary means with respect to a pivotal axis in fixed relation to the secondary means and in approximately spaced parallel relation to the path, the lifting means being supported by said primary means remotely from, and more closely to the path than, said axis, stationary means for supporting the secondary means and for limiting the movement of the secondary means to an ambit parallel to said path, said element being supported by secondary means for movement along an ambit fixed with respect to said secondary means, a jack, means for connecting the jack with the primary supporting means and the element and disposing the jack intermediately therebetween whereby the jack may simultaneously apply force in one direction to the primary means and in the opposite direction to the element, the jack being related to the primary supporting means and the element through leverage ratios embodied in the connecting means to first move the element out of engagement with the conveyor, and then as the element engages a stop to swing the primary means in a direction carrying the lifting means away from the secondary means.

11. In a system for handling articles comprising a conveyor member which continuously traverses a fixed path and has means uniformly spaced along the member for supporting separate articles, a conveyor member having a plurality of detents, each detent having fixed identical relation with one of said positions and the path; an article-supporting member in spaced lateral relation with the conveyor; apparatus operating in successive cycles to transfer articles from one member to the other comprising means for gripping an article, an elongate frame having guides, a slide component carried by the frame having an ambit of reciprocation relative to the guides aligning said component for movement extending in a direction generally toward and away from the members, said gripping means being attached to the end of the slide component nearer the members, a movable boom overhanging the conveyor, stationary means for supporting the boom and guiding the movement of the boom with the portion thereof for supporting the frame disposed over the conveyor in an ambit parallel to said path, means for pivotably connecting the frame to the boom along an axis substantially parallel to the path and spaced therefrom to dispose a major portion of the frame nearer the path than said axis, an element supported by the boom in reciprocable relation therewith for movement into and out of a position for engagement with successive detents, a power-operated jack supported within the boom having one end connected with the frame and its other end connected to one end of a bell crank pivotably supported within the boom, the other end of the bell crank engaging said element whereby the jack may apply force in opposing directions to move the element out of said position for engagement with a detent and to swing the free end of the frame away from the boom.

12. In combination with a machine for handling annular yarn packages comprising a plurality of rotary buckets spaced along a circumference of a turntable member and a plurality of detents attached to said member, each detent having fixed identical relation with one of said rotary buckets; a package-supporting member providing a fixed transfer point for packages in spaced lateral relation with the conveyor; and apparatus operating in successive cycles to transfer the packages from one member to the other, comprising an expandable gripper, an elongate frame, an elongate slide supported by the frame for movement lengthwise thereof, the gripper being attached to the end of the slide closer to the member, said slide and the gripper having an ambit of reciprocation relative to the frame extending in a direction toward and away from the members, a boom for supporting the frame having a head portion overhanging the conveyor and a common axis of rotation with the turntable of the machine, means for pivotably connecting a portion of the frame to the boom along the axis substantially parallel to the path and spaced with respect to the path to dispose a substantial portion of the frame closer to the path than the axis, an element supported by the boom for reciprocable movement relative thereto into and out of a position for engaging successive detents, a pneumatic jack and means associated therewith for connecting one end of the jack with the frame and the other end with said element to simultaneously apply force in opposite directions, said jack being interrelated with the element and the frame by the connecting means for first moving the element out of said position for engagement with a detent and then for swinging the free end of the frame away from the boom, a pneumatic jack for reciprocating the slide and the gripper, a pneumatic jack anchored to the stationary means and connected to the boom for returning the boom to a position of rest after disengagement of the element from a detent, a pneumatic jack mounted on said slide for expanding and contracting the gripper and control means comprising with air conducting means connected to all of said jacks for actuating them in cyclic relationship.

References Cited in the file of this patent
UNITED STATES PATENTS

| | | |
|---|---|---|
| 1,654,091 | Peiler | Dec. 27, 1927 |
| 2,685,971 | Ewing | Aug. 10, 1954 |